May 6, 1952     H. NEUSCHAEFER     2,595,403
LIPSTICK CASE
Filed May 19, 1948
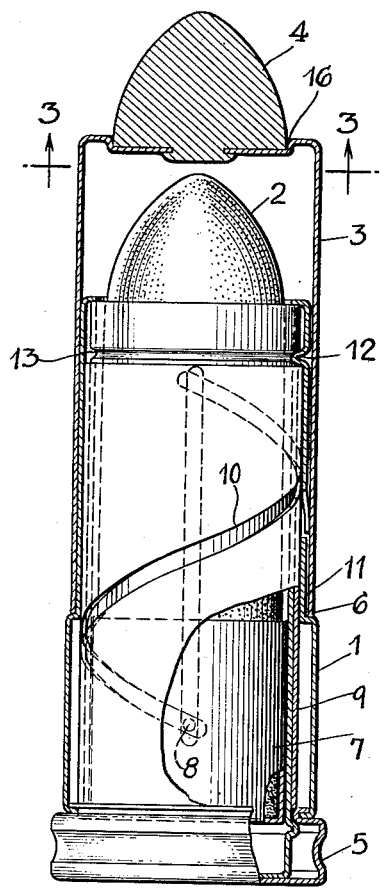
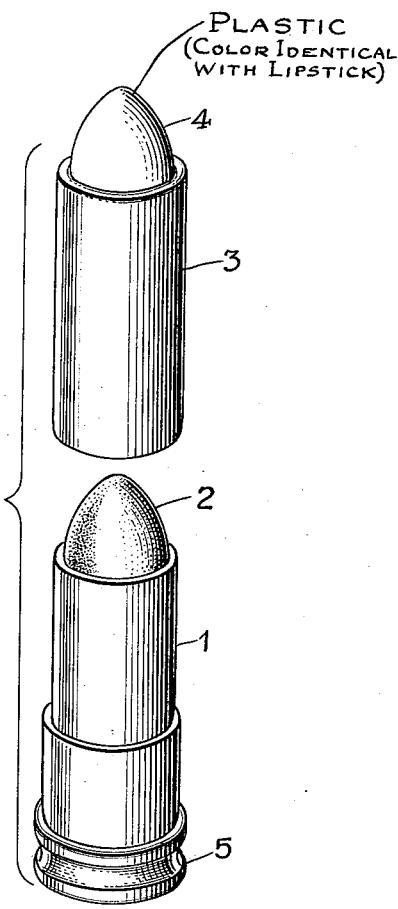
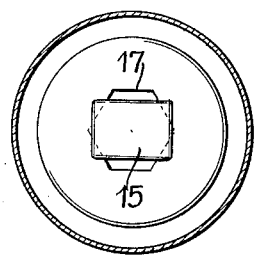
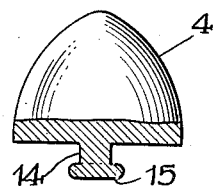
INVENTOR.
HELEN NEUSCHAEFER.
BY
ATTORNEYS.

Patented May 6, 1952

2,595,403

UNITED STATES PATENT OFFICE 2,595,403

LIPSTICK CASE

Helen Neuschaefer, Rye, N. Y., assignor to A. Sartorius & Co., Inc., New York, N. Y., a corporation of New York Application May 19, 1948, Serial No. 27,950

2 Claims. (Cl. 40—2)

This invention relates to a lipstick case. In purchasing lipstick, it is important to know its color. Heretofore, purchasers have made streaks on the hand or other object to ascertain the color, but more recently it has been proposed to indicate the color by apertures or transparent portions in the case showing the actual stick or some reproduction of its color through the aperture. These proposals have not gone into commercial use, so far as I am aware, since they constitute both expensive and unsatisfactory constructions.

The principal object of the invention, accordingly, is to provide an inexpensive, reliable color indicator as a part of a lipstick case.

The invention accordingly comprises the novel devices and combinations thereof, specific embodiments of which are described herein by way of example only and in accordance with the manner in which I now prefer to practice the invention.

I have found in accordance with my invention that an external color indicator mounted on the case having the color and preferably also the shape of the tip of the lipstick in the case is a sure means of identifying and matching the color desired and I have found also a simple and effective means of providing and securing such a color indicator to the case.

In the accompanying drawings, I have shown a preferred lipstick case with color indicator mounted in a preferred manner. In these drawings, Figure 1 represents a lipstick case with the base below containing the lipstick separated from the cover above containing the color indicator;

Fig. 2 is a cross-sectional elevation of the complete lipstick case;

Fig. 3 is a cross section on the line 3—3 of Fig. 2, and

Fig. 4 is a detailed view of the color indicator prior to assembly with the cover.

Referring now to the drawings, the numeral 1 indicates a tubular container constituting the base with the tip 2 of the lipstick projecting therefrom. The numeral 3 indicates the tubular cover telescoped over one end of the base provided with an external tip 4 of plastic material, having a shape and color identical with that of the lipstick 2. When the parts are assembled as indicated in Fig. 2, the lipstick itself is hidden, but the plastic tip 4 provides a reliable external indicator of the exact color of the lipstick 2 within and closely resembles the actual protruded lipstick.

As shown also in Fig. 2, the base is provided with a rotatable bottom 5 which is adapted to rotate and, upon rotation in one direction, will cause the lipstick to protrude from the casing 1 and, upon rotation in the opposite direction, will cause the lipstick to descend again into the casing. As shown, the cover 3 is mounted so that it telescopes over the casing 1 to a position covering the greater part of the length of the casing and having its lower extremity resting on an annular ledge 6 formed in the casing 1. The means for protruding the lipstick 2 include a cup 7 in which the end of the lipstick 2 opposite the tip seats. The cup is provided with a cam pin 8 attached to one side thereof. The cup 7 is located inside of a tube 9 of about the same length as the casing 1. This tube has a cam slot 10 in which the cam pin 8 operates. Outside of this tube is a stationary sleeve 11 mounted concentrically about the tube having a struck-in portion 12 which is adapted to fit into a groove 13 in said tube 11 near the tip of the lipstick 2, by which means, as the base 5 is rotated, the longitudinal movement of the tube 11 is restrained, while the cup 7 moves freely upwardly as the cam slot 10 acts on the pin 8 to cause such upward movement.

The color indicator 4 is made of plastic material, preferably styrene. As shown in Fig. 4, this material is made in a shape identical with the tip end of the lipstick 2. It is also provided with a shank 14 which is circular in cross section and terminates in an enlarged portion 15 which may be of any desired shape, here shown as globular. The cover 3 is debossed or countersunk as shown at 16 to receive the face of the color indicator where it joins the upper part of the shank. It is also pierced with a preferably hexagonal aperture 17 (see Fig. 3). In assembling the cover with the color indicator, the shank and lower portion 15 thereof are thrust through the opening 17 and while the indicator is firmly held from above, a plunger strikes the lower part 15, upsetting it and causing a sort of rivet of the portion 15 about the underwall of the countersunk portion 16.

One of the chief advantages of my device is that I am able to adjust the production of lipstick cases with different color indicators therein in accordance with the demand for the various lipstick colors on the market. At the present time, a minimum of six shades represent the range of colors in demand. This demand, however, has varied from time to time and my invention makes it possible to adjust the indicators when the demand changes. Thus, the base and casing can be ordered in large quantities, thus saving considerable expense. If there is a large demand for a particular shade, I then make up a mixture of resin and dye which will match that shade and mold it for the desired quantity. I then pierce the cap 3 of the casing and apply the color indicator as described above. In other words, it is not necessary to stock large quantities of lipstick cases with colors therein that may go off the market and which will then have to be scrapped. Furthermore, through my invention I am able to make a very accurate matching of any new shades that may be desired. In addition, since my matching tip is externally placed, it is easy to see and consequently affords a reliable indicator of the shade of lipstick inside.

What I claim is:

1. A lipstick case having a tubular container and a tubular cover telescoped over one end thereof, said cover being provided with an external plastic color indicator on the closed end thereof having a shank passing through the cover and upset on the inside thereof to fasten the color indicator and cover together.

2. A lipstick case having a tubular container and a tubular cover telescoped over one end thereof provided with an external tip of plastic material having a color identical with that of the lipstick and simulating the tip thereof, said plastic tip being provided with a shank passing through the cover and having its end upset on the inside of the cover.

HELEN NEUSCHAEFER.

REFERENCES CITED

The following references are of record in the file of this patent:

UNITED STATES PATENTS

| Number | Name | Date |
|---|---|---|
| 1,490,341 | Olney | Apr. 15, 1924 |
| 2,222,415 | Landwehr | Nov. 19, 1940 |
| 2,304,681 | Eckart | Dec. 8, 1942 |
| 2,333,812 | Nyden | Nov. 9, 1943 |

FOREIGN PATENTS

| Number | Country | Date |
|---|---|---|
| 262,297 | Great Britain | Dec. 9, 1926 |